Patented Apr. 23, 1940

2,198,173

UNITED STATES PATENT OFFICE 2,198,173

NITROCELLULOSE SOLUTION

Leonard P. Moore and Richard O. Roblin, Jr., Stamford, Conn., assignors to American Cyanamid Company, New York, N. Y., a corporation of Maine No Drawing. Application June 14, 1939, Serial No. 279,140

10 Claims. (Cl. 134—79)

This invention relates to a nitrocellulose solution and a method of making the same.

It is known that whenever any nitrocellulose solution is made up, the initial viscosity is high and on aging, the viscosity drops to some constant value. The rate of drop is important and the initial viscosity is a measure to some extent of the strength of the solvent, a high viscosity for a given percent solids indicating a weak solvent.

Lactate esters, such as the ethyl and butyl compounds, are employed as high boiling solvents in nitrocellulose lacquers for the purpose of regulating the rate of evaporation of the liquid ingredients and controlling the final character of the film. They do not appreciably lower the initial viscosity of the solution. It is readily seen, therefore, that in applying a freshly prepared lacquer of this type, considerable dilution is necessary in order to lower the viscosity of the solution to suit conditions of application. As a result, more coats are required to produce the desired finish.

It is also practically impossible to use the lactate esters in pigmented nitrocellulose lacquers, particularly in combination with zinc oxide, as a thickening or "livering" condition sets in. This phenomenon, which may be the result of hydrolysis of the ester and subsequent precipitation of zinc soaps, manifests itself in one or more forms, such as an increase in the viscosity of the lacquer, formation of large particles or agglomerates and loss of film gloss.

A principal object of the present invention is to provide a nitrocellulose solution of substantially low initial viscosity. Another object is the provision of a nitrocellulose solution, the viscosity of which does not change appreciably on aging. A further object is the provision of a nitrocellulose solution containing a high boiling solvent which insures elimination of "livering" when pigments are incorporated therein. Other objects will become apparent as the description of the invention proceeds.

These objects may be accomplished by incorporating, by any suitable means in a nitrocellulose solution, a substance chosen from the group consisting of dimethyl cyanamide and diethyl cyanamide as hereinafter more fully described.

As illustrating the practice of this invention, a clear lacquer was employed of the following composition:

EXAMPLE I

| | Grams |
|---|---|
| ½ sec. nitrocellulose 70% in alcohol | 73 |
| Rezyl 19*, 50% in toluol | 300 |
| Dibutyl phthalate | 15 |
| Butyl acetate | 96.75 |
| Butanol | 64.5 |
| Toluol | 172.5 |
| Ethyl acetate | 64.5 |
| 2B alcohol | 9.25 |

*(A non-drying oil modified glycerol phthalate resin used as a plasticizing resin with nitrocellulose, a product of the American Cyanamid & Chemical Corporation. No modified glycerol phthalate resins of this class have come to the attention of the applicants which are not compatible with dimethyl cyanamide or diethyl cyanamide.)

The above lacquer may be prepared by any of the commonly employed methods such as first dispersing the nitrocellulose in a suitable portion of the solvent. This intermediate is then placed in an ordinary mixer together with the remaining ingredients in the proportions indicated. The mixture is thoroughly agitated until a homogeneous product is obtained.

The following viscosity determinations were made with a standard No. 4 Ford Cup. The readings are in seconds, taken at a temperature of 25° C. In each determination, a mixture of 16 grams of the high-boiling solvent and 200 grams of the clear lacquer prepared as above, was thoroughly agitated in an ordinary mixer until a uniform product was obtained.

Table I

| Time in hours | Ethyl lactate clear lacquer | Butyl lactate clear lacquer | Diethyl cyanamide clear lacquer |
|---|---|---|---|
| 0 | 46.2 | 51.4 | 33.0 |
| 48 | 42.8 | 49.0 | 31.4 |
| 120 | 41.6 | 46.0 | 29.0 |
| 168 | 41.2 | 44.0 | 28.6 |
| 288 | 35.6 | 40.0 | 25.6 |
| 384 | 37.0 | 40.0 | 26.4 |

Table II

| Time in hours | Dimethyl cyanamide clear lacquer run No. 1 | Dimethyl cyanamide clear lacquer run No. 2 |
|---|---|---|
| 0 | 30 | 30 |
| 24 | 30 | 30 |
| 48 | 30 | 30 |
| 120 | 30 | 30 |
| 312 | 29 | 29 |
| 360 | 29 | 29 |
| 528 | 29 | 29 |

Referring to Table I, it will be seen that the three lacquers approach a constant viscosity at approximately the same rate which means that the aging properties are similar. However, the initial viscosity is considerably lower, and the total decrease in viscosity is least for the lacquer containing diethyl cyanamide.

Referring to Table II, it is readily seen that the initial viscosity of the lacquer containing the dimethyl cyanamide is much lower than that obtained for the lacquers containing the lactate solvents in Table I, and that the viscosity does not change appreciably as the lacquer is aged.

These viscosity determinations indicate that the dimethyl and diethyl cyanamides are more powerful solvents for nitrocellulose than either the ethyl or butyl lactates and as a result, a better dispersion of the nitrocellulose is obtained.

In determining the effect of incorporating a high-boiling solvent such as ethyl lactate or diethyl cyanamide in a pigmented nitrocellulose lacquer in regard to "livering" tendencies, lacquers of the composition given in Examples II and III were prepared.

EXAMPLE II

| | Grams |
|---|---|
| ½ sec. nitrocellulose, 70% in alcohol | 21.2 |
| Damar gum | 19.8 |
| Dibutyl phthalate | 8.5 |
| Zinc oxide | 31.7 |
| Ethyl lactate | 42.5 |
| Naphtha | 55.3 |
| Xylol | 7.9 |
| Ethyl alcohol | 4.3 |

EXAMPLE III

| | Grams |
|---|---|
| ½ sec. nitrocellulose, 70% in alcohol | 21.2 |
| Damar gum | 19.8 |
| Dibutyl phthalate | 8.5 |
| Zinc oxide | 31.7 |
| Diethyl cyanamide | 42.5 |
| Naphtha | 55.3 |
| Xylol | 7.9 |
| Ethyl alcohol | 4.3 |

These lacquers were prepared in a manner similar to the method described under Example I.

The following viscosity determinations were made using a standard No. 4 Ford Cup. The readings are in seconds taken at a temperature of 25° C.

Table III

| Time in days | Ethyl lactate pigmented lacquer |
|---|---|
| 0 | 45 |
| 11 | 54 |
| 18 | 62 |
| 21 | 73 |
| 32 | Thickened to a gel. |

Table IV

| Time in days | Diethyl cyanamide pigmented lacquer |
|---|---|
| 0 | 29 |
| 6 | 22 |
| 25 | 19 |

From the viscosity readings given in these tables, it is readily seen that in the ethyl lactate-pigmented lacquer a "livering" condition occurred causing a gradual increase in viscosity until the mass thickened to a gel, whereas in the diethyl cyanamide-pigmented lacquer, a low initial viscosity resulted which gradually decreased to a constant value showing that a stable composition was obtained.

It is to be understood that the lacquers utilized in the above examples are typical compositions and that the types and proportions of ingredients shown may be varied over a considerable range and a substitution of an equivalent material or a change in proportions to suit the conditions of application or other special requirements is considered within the ordinary practice of one skilled in the art.

Optimum conditions are obtained when the high-boiling solvent, namely dimethyl cyanamide or diethyl cyanamide, is utilized within the range of one to twenty-five percent by weight of the nitrocellulose solution. 8% is a preferred proportion.

Although the typical lacquers shown above consist, in addition to the nitrocellulose and high-boiling solvent, of other ingredients such as a resin, plasticizer, diluents and low-boiling solvents, this invention is to be construed broadly as including a solution of nitrocellulose in either of the high-boiling solvents, namely dimethyl cyanamide or diethyl cyanamide.

Dialkyl cyanamides higher than the dimethyl and diethyl compounds are in general unsatisfactory as solvents for use in nitrocellulose lacquers due to their high boiling points.

Nitrocellulose lacquers prepared in accordance with this invention may be utilized for general industrial finishing and are of particular merit where extraordinary lustre and smoothness in the surface of the film are desired.

When tested at 78° F. and 50% relative humidity, the blush resistance of a given lacquer containing ethyl lactate is substantially improved if the ethyl lactate is replaced by an equal weight of diethyl cyanamide.

An important advantage in this invention is that a nitrocellulose solution of low initial viscosity may be obtained which does not change appreciably on aging and which does not require the amount of dilution to suit conditions of application that is needed with similar known compositions.

The high boiling solvents, namely dimethyl cyanamide and diethyl cyanamide, insure complete prevention of "livering" in nitrocellulose pigmented lacquers, even when zinc oxide is used as the sole pigment. They possess unusually high dispersing power in a nitrocellulose solution and in turn regulate the rate of evaporation of the liquid ingredients from a lacquered surface, thereby controlling the type of flow and character of the film.

While the invention has been described with particular reference to specific embodiments, it is to be understood that it is not to be limited thereto, but is to be construed broadly and restricted solely by the scope of the appended claims.

We claim:

1. A solution of nitrocellulose including a substance selected from the group consisting of dimethyl cyanamide and diethyl cyanamide.

2. A lacquer including nitrocellulose, a substance selected from the group consisting of dimethyl cyanamide and diethyl cyanamide, a resin which can be used to plasticize nitrocellulose and which is compatible with dimethyl cyanamide or diethyl cyanamide, a plasticizer and a solvent.

3. A lacquer including nitrocellulose, a substance selected from the group consisting of dimethyl cyanamide and diethyl cyanamide, a resin which can be used to plasticize nitrocellulose and which is compatible with dimethyl cyanamide or diethyl cyanamide, a plasticizer, a solvent and a diluent.

4. Composition of claim 1 in which the cyanamide is present in the proportion of 8 per cent by weight of the whole.

5. Composition of claim 1 in which the cyanamide is present within the range of 1 to 25 per cent by weight of the whole.

6. Composition of claim 2 in which the cyanamide is present in the proportion of 8 per cent by weight of the whole.

7. Composition of claim 2 in which the cyanamide is present within the range of 1 to 25 per cent by weight of the whole.

8. A method of lowering the viscosity of a nitrocellulose solution which includes adding thereto a substance chosen from the group consisting of dimethyl cyanamide and diethyl cyanamide.

9. Method of claim 8 in which the cyanamide is present in the proportion of 8 per cent by weight of the whole.

10. Method of claim 8 in wich the cyanamide is present within the range of 1 to 25 per cent by weight of the whole.

LEONARD P. MOORE.
RICHARD O. ROBLIN, JR.